United States Patent [19]

Hübner et al.

[11] Patent Number: 4,586,829

[45] Date of Patent: May 6, 1986

[54] TEMPERATURE MEASURING RESISTOR PROBE

[75] Inventors: Erwin Hübner, Grafing; Hans Meier, Haar, both of Fed. Rep. of Germany

[73] Assignee: Siemens Aktiengesellschaft, Berlin & Munich, Fed. Rep. of Germany

[21] Appl. No.: 629,905

[22] Filed: Jul. 11, 1984

[30] Foreign Application Priority Data

Jul. 29, 1983 [DE] Fed. Rep. of Germany ....... 3327389

[51] Int. Cl.⁴ ............................ G01K 7/16; H01C 7/02
[52] U.S. Cl. ....................................... 374/144; 338/28; 374/183
[58] Field of Search .................. 374/185, 144; 338/28, 338/30, 22; 29/612, 621

[56] References Cited

U.S. PATENT DOCUMENTS

| | | | |
|---|---|---|---|
| 3,289,278 | 12/1966 | Gaia | 29/621 X |
| 3,890,588 | 6/1975 | Kanaya et al. | 338/28 |
| 3,896,409 | 7/1975 | Micheli et al. | 338/28 |
| 3,913,058 | 10/1975 | Nishio et al. | 374/144 X |
| 3,915,135 | 10/1975 | Kushida et al. | 338/28 X |
| 3,952,276 | 4/1976 | Walch et al. | 338/22 R X |
| 4,085,398 | 4/1978 | Betram et al. | 29/612 X |
| 4,087,775 | 5/1978 | Mackenzie et al. | 29/612 X |
| 4,323,875 | 4/1982 | Tentarelli et al. | 29/612 X |
| 4,425,692 | 1/1984 | Minegishi et al. | 29/611 |

Primary Examiner—Daniel M. Yasich
Attorney, Agent, or Firm—Hill, Van Santen, Steadman & Simpson

[57] ABSTRACT

A temperature measuring probe for measuring excess temperatures at the exhaust of an internal combustion engine is provided which incorporates an NTC resistor in a gas-tight metal housing. The housing is vacuum-tight, shock-proof, and vibration-proof (10 g RMS, 0 through 500 Hz) and the probe is suitable for temperature sensing up to about 700° C. The probe is particularly suitable for use as a temperature monitor for turbochargers.

3 Claims, 1 Drawing Figure

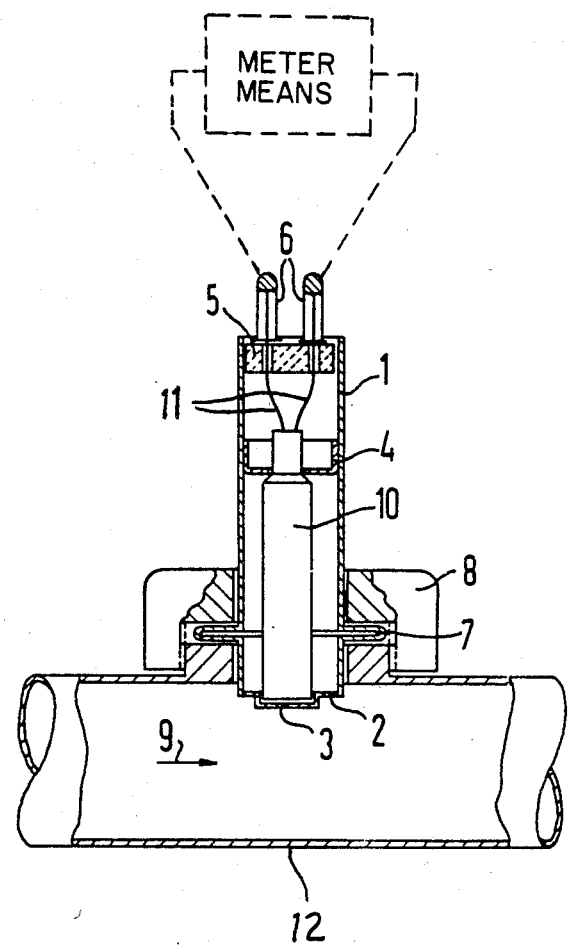

TEMPERATURE MEASURING RESISTOR PROBE

BACKGROUND OF THE INVENTION

1. Field of the Invention

The invention lies in the field of temperature measuring probes, particularly probes for measuring temperatures in the exhaust of an internal combustion engine.

2. Prior Art

Thermistors are universally known. The term "thermistor" has reference to a temperature-dependent resistor comprised of semiconductor material having a relatively high negative temperature coefficient. Thermistors are also referred to as NTC (negative temperature coefficient) resistors. While silicon, germanium, or Groups III-V compounds in mono-crystalline form, are predominantly employed as base materials in electronic semiconductor elements, NTC resistors as discrete components are fabricated almost exclusively of poly-crystalline oxide ceramic. The NTC resistor bodies sintered and pressed into formed bodies yield considerable advantages over other semiconductor materials. Above all, they offer the possibility of being able to vary specific resistance and temperature coefficients over wide limits with relatively simple means.

BRIEF SUMMARY OF THE INVENTION

More particularly, this invention is directed to a temperature measuring probe for measuring temperatures in the exhaust gas of an internal combustion engine. The probe incorporates a NTC resistor within a gas-tight metal housing.

A primary object of the present invention is to create a temperature sensor in a vacuum-tight, impact-proof and vibration-proof form (10 g RMS, 0 through 500 Hz) which is suitable for use at temperatures up to about 700° C.

Other and further objects, aims, purposes, features, advantages, embodiments, and the like will be apparent to those skilled in the art from the present specification taken with the accompanying drawing.

BRIEF DESCRIPTION OF THE DRAWING

The appended FIGURE is a side elevational view of one embodiment of the present invention with some parts thereof broken away and some parts thereof shown in section.

DETAILED DESCRIPTION

The invention is explained in greater detail with reference to a preferred exemplary embodiment. The temperature measuring probe shown appended in the FIGURE utilizes a temperature sensing NTC resistor 10, which is mounted axially in, and in radially spaced relationship to circumferential side wall portions of, a crimped metal tube or housing 1 consisting of a melt-down alloy (Vacon) containing NiFe or NiFeCo. The tube 1 is sealed at the bottom with a closure cover 2. After the NTC resistor 10 has been inserted into the tube 1 so that its lower end engages into the depression 3 formed in the cover 2, it is clamped about its upper end with centrally apertured circumferentially flanged sleeve 4, which is nestably received within the cross-sectionally circular walls of tube 1. Flanged portions of sleeve 4 are spot-welded to the adjacent walls of tube 1 by spot-welding apparatus (not shown). Within the top end of the tube 1 a ceramic wafer 5 is nestably received and wafer 5 is soldered to tube 1 in gas-tight relationship. Two small tubes 6, which each consist of the same material as the tube 1, are soldered to and carried by the ceramic wafer 5 and extend outwardly from one face of wafer 5. The NTC resistor leads 11 are conducted through these small tubes 6. After an evacuation and aeration process, finally, the leads 11 and small tubes 6 are soldered to one another. This is accomplished, for example, by means of an argon arc, solder ring process, or the like. This method step is conditioned by the fact that the NTC resistor may not come into contact with CO or $CO_2$ but requires some $O_2$ for re-oxidation. The crimped metal bead 7 formed in tube 1 allows for easy mounting of the temperature probe to the exhaust manifold of an internal combustion engine by means of a spigot nut 8. The arrow referenced 9 indicates the direction of flow of the exhaust gases in manifold 12.

The temperature measuring probe shown in the FIGURE is thus seen to comprise a combination of tube 1 and NTC resistor 10 together with the coacting components including flanged plate member 4, ceramic wafer 5, leads 11, and crimped bead 7.

Those skilled in the art will appreciate that variations and changes in the present invention can be made without departing from the spirit and scope thereof.

We claim:

1. A temperature measuring probe for measuring exhaust gas temperature of an internal combustion engine comprising an NTC resistor in a crimped tube, said tube consisting of an NiFeCo-containing melt-down alloy, and said tube being bottomly closed with a sealed cover; said NTC resistor having a lower end region which is received into a central depression formed in said cover; and said NTC resistor having an upper end region which extends through a central hole in a peripherally flanged plate member and said flanged plate member is engaged with radially adjacent portions of said tube; said tube being sealed at its top with soldering means to a ceramic wafer means which wafer means includes sealed leads for said NTC resistor, and said tube is sealed after evacuation and aeration, whereby said cover is adapted for exposure to such exhaust gases and temperatures sensed by said NTC resistor are measurable through said leads, and said leads are connectable to responsive means to detect temperatures.

2. The temperature measuring probe of claim 1, wherein said metal housing includes a tube portion and said tube portion consists of a melt-down alloy containing NiFe or NiFeCo and said NTC resistor extends axially in said tubular portion, and said tube is closed at its bottom end with a sealed cover (2); and said tube is sealingly closed at its top end with a ceramic wafer; and leads to said NTC resistor are conducted through said ceramic wafer.

3. The temperature measuring probe of claim 2 wherein said tube is characterized by being circumferentially crimped and consists of a melt-down NiFeCo alloy.

* * * * *